United States Patent

[11] 3,632,357

[72] Inventor Wesley H. Childs
    Chicago, Ill.
[21] Appl. No. 845,876
[22] Filed July 29, 1969
[45] Patented Jan. 4, 1972
[73] Assignee Standard Brands Incorporated
    New York, N.Y.

[54] METHOD OF PRODUCING HARD CANDY
    7 Claims, No Drawings

[52] U.S. Cl. .................................................. 99/134R
[51] Int. Cl. .................................................. A23g 3/00
[50] Field of Search ..................................... 99/134

[56] References Cited
    OTHER REFERENCES

Richmond, Walter, Choice Confections " Hard Candy" Manf. Conf. Pub. Co. Oak Park, Ill. 1954 pp. 367– 368

Rose, Condensed Chemical Dictionary 7th ed. Reinhold Pub. Corp. New York 1966. p. 433.

Chemicals Used in Food Processing National Academy Sciences–Natl. Research Council Pub. 1274 Wash. DC 1965 p. 43

*Primary Examiner*—Raymond N. Jones
*Assistant Examiner*—J. M. Hunter
*Attorneys*—Aaron B. Karas and William Koenen ABSTRACT: A mixture containing a sweetening agent, water and fumaric acid is formed and cooked until a homogeneous mass is formed. A second mass containing corn syrup, sucrose and water is formed and cooked at a temperature in the range of 250° to 330° F. until the constituents are uniformly distributed throughout the mass and the desired moisture level is reached. This second mass is cooled and the first mass is incorporated therein. Hard candy is then prepared from this mixture.

METHOD OF PRODUCING HARD CANDY

THE INVENTION

The present invention relates to a novel hard candy composition and methods of preparing the same. Particularly, the present invention relates to a novel hard candy composition containing fumaric acid and methods of preparing the same.

In the manufacture of hard candy, it is the general practice in the art to form a mixture of sucrose, corn syrup and water and cook the mixture at high temperatures, generally in the range from about 250° to about 330° F., until the desired moisture level is reached and the mixture is a plastic mass. Generally, the mixture is cooked until a moisture level of between about 0.2 and about 4 percent by weight is obtained, although in some instances the mixture is cooked to slightly higher or lower moisture levels depending upon the starting constituents, the proportions thereof and properties desired in the finished hard candy. This mass may then be transferred to a cooling slab where it is allowed to cool for a brief period of time until it starts to harden around the edges. At this point, an edible fruit acid, such as citric, tartaric, malic or a mixture thereof, and the desired flavor and color are added. The edges of the mass are folded in toward the center and the folding continued to distribute the color, flavor and acid thoroughly and evenly throughout the mass. The acid, citric tartaric or malic, will readily disperse or will be solubilized into the mass.

The selection of the acid to be used is generally based upon the flavor it naturally typifies; for instance, citric acid typifies orange and lemon flavors and tartaric typifies grape flavor.

Invert syrups or reducing sugars may also be incorporated into the mass in order to insure that the candy will not grain or become cloudy. In some instances, small amounts of cream of tartar may be added to the mass while it is on the cooling slab in order to invert a portion of the sucrose. Smaller amounts of invert sugar than the optimum are avoided since they will cause graining of the candy while larger amounts will result in the candy being undesirably soft and having poor keeping qualities because of its tendency to absorb moisture. One of the reasons acids are not added to the candy mass while it is being cooked is that inversion will occur at a rate and to the extent that it is impossible to control to a predictable and suitable degree.

Fumaric acid has a taste sensation which is quite distinct from other edible fruit acids, namely, citric, tartaric or malic, normally used in hard candies. Thus, if fumaric acid could be used in the manufacture of hard candies, it would provide the benefit that a hard candy would be available having a different taste sensation than the presently manufactured hard candies. Also, the use of fumaric acid provides economic benefits since it is less costly on an equal weight basis than other food acids, and smaller quantities are needed to provide the desired degree of acidity.

Accordingly, it is the principal object of the present invention to provide a hard candy composition containing fumaric acid which is not grainy and has excellent storage characteristics.

It is still a further object of the present invention to provide a method of incorporating fumaric acid into hard candy constituents and forming therefrom hard candy.

These objects, and others, which will be apparent from the following description, may be attained by forming a first mass containing water, a sweetening agent and fumaric acid, cooking this mass at elevated temperatures, forming a second mass of normal hard candy constituents including sucrose, cooking this second mass at elevated temperatures to thoroughly disperse the constituents substantially uniformly throughout and sufficient to remove a portion of the water therefrom, cooling the second mass, incorporating an amount of the first mass into the second mass to achieve the desired degree of acidity, and forming hard candy therefrom.

Typically, the sweetening agent is a low or medium D.E. corn syrup, or a high maltose type corn syrup and the amount thereof used in the preparation of the first mass is between about eight and 12 times and preferably 10 times, on a weight basis, the amount of fumaric acid desired in the finished hard candy. In some instances, it may be desirable to provide a hard candy with a combination of acids, for instance, citric and fumaric. In this case, smaller amounts of fumaric acid would be used and the incorporation of citric acid may be carried out, for instance, by simply mixing the citric acid with the candy while it is on the cooling slab.

The temperature at which the first mass, containing the fumaric acid, is cooked may vary over a relatively wide range, for instance, from about 200° to about 280° F. However, when a low or medium D.E. corn syrup is used it is preferable to cook the mass in the temperature range of from about 200° to about 270° F. and most preferably in a temperature range of from about 210° to about 265° F.

Prior to incorporation of the first mass, which contains the fumaric acid, into the second mass it is preferred that the second mass is cooled to a temperature below that where substantial inversion of the sucrose occurs.

Preferably, the moisture content of the hard candy of the present invention is in the range from about 0.7 to about 1.25 percent by weight.

Other methods of providing fumaric acid in hard candies have been tried but they were not successful. For instance, fumaric acid was added to the candy mass while it was being cooked. In this case, the resulting candy was tacky and did not have the desired storage characteristics and in some instances caramelization resulted. Fumaric acid was also added to the candy mass while it was on the cooling slab but in this case the fumaric acid was not uniformly distributed throughout the candy and subsequent sugar crystallization or graining in the candy resulted.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

EXAMPLE I

A first mass containing 250 grams of 42 D.E. corn syrup, 25 grams of fumaric acid and 50 grams of water was prepared and cooked with agitation to a temperature of about 260° to 265° F. A second mass of hard candy constituents containing 600 grams of sucrose, 325 grams of 42 D.E. corn syrup, and 200 grams of water was cooked with agitation to a temperature of about 300° F. The second mass was then poured onto a cooling slab which was cooled with circulating tap water and 81 grams of the first mass, the desired color and flavor added and the masses continuously folded until a homogeneous mass was prepared.

A second and third batch of hard candy was prepared in substantially the manner described above, except that in the case of the second batch the first mass was prepared containing 200 grams of 42 D.E. corn syrup, 25 grams of fumaric acid, 50 grams of water and 45 grams of dextrose and 102 grams of this mass was incorporated into the second mass. In the case of the third batch, the first mass was prepared containing 250 grams of 42 D.E. corn syrup, 44.2 grams of fumaric acid, 60 grams of water and 42 grams of lactose and 70 grams of this mass was incorporated into the second mass. All the hard candy prepared from these batches had good storage characteristics.

EXAMPLE II

A first mass was prepared containing 8.5 pounds of 42 D.E. corn syrup, 0.859 pounds of fumaric acid and the necessary color, and cooked to a temperature of about 210° F. A second mass containing 45 pounds of sucrose, 55 pounds of 42 D.E. corn syrup and 22 pounds of water was cooked to a temperature of 278° F., and subjected to 27 inches of vacuum for 10 to 15 minutes in a Simplex Cooker manufactured by Vacuum Candy Machinery Co. The first mass at a temperature of 210° F. was discharged into a table mixer where it was mixed with the second mass for about 6 minutes, flavor added and the mixture mixed again for 2 minutes. Hard candy was prepared from this mixture.

EXAMPLE III

A first mass was prepared containing 75 grams of 42 D.E. corn syrup, 7.7 grams of fumaric acid, and the desired color and cooked to a temperature of about 210° F. A second mass containing 600 grams of sucrose, 250 grams of 42 D.E. corn syrup, and 250 grams water were cooked to a temperature of 300° F. under atmospheric conditions. The second mass was poured onto a cooling slab and after a brief cooling period the first mass at a temperature of 210° F. was incorporated into the second mass by folding the masses over each other. Flavor was incorporated into the masses and hard candy prepared therefrom in normal manner. The hard candy prepared according to this example was preferred over the hard candy prepared in example II. In example II, the amount of reducing sugars present was considered too high.

The terms and expressions which have been employed are used as terms of description and not of limitation and it is not intended, in the use of such terms and expressions, to exclude any equivalents of the features shown and described or portions thereof, since it is recognized that various modifications are possible within the scope of the invention claimed.

What is claimed is:

1. A method of producing hard candy containing fumaric acid comprising forming a first mass containing water, a sweetening agent, and fumaric acid, cooking this mass at elevated temperatures to provide a homogeneous mixture, forming a second mass of normal hard candy constituents including sucrose, cooking this second mass at elevated temperatures to thoroughly disperse the ingredients thereof substantially uniformly throughout and sufficient to remove a portion of the water therefrom, cooling the second mass, incorporating a sufficient amount of the first mass into the second mass to achieve therein the desired degree of acidity, and forming hard candy therefrom.

2. A method of producing hard candy containing fumaric acid as defined in claim 1, wherein the second mass is cooled to a temperature below that where sucrose inversion occurs prior to the incorporation of the first mass therein.

3. A method of producing hard candy containing fumaric acid as defined in claim 2, wherein the sweetening agent is a corn syrup.

4. A method of producing hard candy containing fumaric acid as defined in claim 3, wherein the first mass is cooked to a temperature of from about 200° to about 270° F.

5. A method of producing hard candy containing fumaric acid as defined in claim 4, wherein the first mass is cooked to a temperature of from about 210° to about 265° F.

6. A method of producing hard candy containing fumaric acid as defined in claim 4, wherein the first mass contains between about eight and 12 times more corn syrup than fumaric acid.

7. A method of producing hard candy containing fumaric acid as defined in claim 6, wherein the first mass contains about 10 times more corn syrup than fumaric acid.

* * * * *